(12) United States Patent
Namito et al.

(10) Patent No.: US 8,979,081 B2
(45) Date of Patent: Mar. 17, 2015

(54) TUBULAR VIBRATION-DAMPING MOUNT

(75) Inventors: Norikatsu Namito, Yokohama (JP); Katsumi Someya, Yokohama (JP); Akihiro Saito, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 332 days.

(21) Appl. No.: 12/808,305

(22) PCT Filed: Dec. 16, 2008

(86) PCT No.: PCT/JP2008/072874
§ 371 (c)(1),
(2), (4) Date: Jun. 15, 2010

(87) PCT Pub. No.: WO2009/078410
PCT Pub. Date: Jun. 25, 2009

(65) Prior Publication Data
US 2010/0295224 A1 Nov. 25, 2010

(30) Foreign Application Priority Data
Dec. 18, 2007 (JP) .................................. 2007-325540

(51) Int. Cl.
*B60G 11/22* (2006.01)
*F16F 9/54* (2006.01)
*B60G 15/06* (2006.01)
*F16F 1/38* (2006.01)

(52) U.S. Cl.
CPC ................. *F16F 9/54* (2013.01); *B60G 15/068* (2013.01); *B60G 2204/41* (2013.01); *F16F 1/3842* (2013.01); *F16F 2228/08* (2013.01)

USPC ....................................... 267/293; 267/140.13

(58) Field of Classification Search
CPC ....................................................... F16F 1/3732
USPC ............... 267/293, 153, 140.13, 141.4, 140.4
See application file for complete search history.

(56) References Cited

U.S. PATENT DOCUMENTS

| | | | | |
|---|---|---|---|---|
| 2,132,840 A | * | 10/1938 | Workman et al. | 267/141.4 |
| 2,538,955 A | * | 1/1951 | Efromson et al. | 267/140.3 |
| 2,781,990 A | * | 2/1957 | Via | 267/141.7 |
| 2,865,586 A | * | 12/1958 | Paulsen | 267/141.4 |
| 2,869,811 A | * | 1/1959 | Boschi | 267/141.4 |
| 4,391,436 A | * | 7/1983 | Fishbaugh | 267/141.1 |
| 2006/0001203 A1 | * | 1/2006 | Haubrich et al. | 267/140.13 |
| 2006/0163785 A1 | * | 7/2006 | Goudie | 267/141.5 |

FOREIGN PATENT DOCUMENTS

| | | |
|---|---|---|
| JP | 48-005339 B1 | 2/1973 |
| JP | 59-191442 A | 12/1984 |

(Continued)

OTHER PUBLICATIONS

International Search Report PCT/JP2008/072874, Mar. 17, 2009.

(Continued)

*Primary Examiner* — Xuan Lan Nguyen
(74) *Attorney, Agent, or Firm* — Sughrue Mion, PLLC

(57) ABSTRACT

A strut mount allows a sufficient pre-compression to be applied to a rubber member without impairing the retaining force for the rubber member, thereby achieving improved durability of the rubber member. A pre-compression member (4) has an outer diameter that is smaller in the distal end side than in the proximal end side, and is press-fitted into the inner peripheral surface of an inner tube member (1).

5 Claims, 3 Drawing Sheets

(56) References Cited

FOREIGN PATENT DOCUMENTS

| | | | |
|---|---|---|---|
| JP | 63-255110 | A | 10/1988 |
| JP | 2004-270947 | A | 9/2004 |
| JP | 2004-308865 | A | 11/2004 |
| JP | 2006-057791 | A | 3/2006 |
| JP | 2006-264425 | A | 10/2006 |
| JP | 2006-281827 | A | 10/2006 |

OTHER PUBLICATIONS

Chinese Office Action issued in Chinese Application No. 200880121361.4 dated Jun. 11, 2012.

Japanese Office Action issued in Japanese Application No. 2007-325540 dated Oct. 2, 2012.

* cited by examiner (a)

(b)

US 8,979,081 B2

TUBULAR VIBRATION-DAMPING MOUNT

TECHNICAL FIELD

The present invention relates to a strut mount comprising an inner tubular member, an outer tubular member arranged on the outer side of the inner tubular member in parallel therewith, and a rubber member arranged between the inner and outer tubular members in a pre-compressed state, for connecting the inner and outer tubular members with each other. In particular, the present invention relates to a strut mount wherein the durability of the rubber member can be improved without sacrifice of a retaining force for the inner tubular member.

BACKGROUND ART

As a suspension for supporting a vehicle body, a strut-type suspension is widely used, in which a shock absorber is combined with a suspension link. In this instance, the vehicle body is connected to the suspension through a vibration-damping means that is called as a strut mount. The strut mount includes an inner tubular member, an outer tubular member arranged on the outer side of the inner tubular member in parallel therewith, and a rubber member arranged between the inner and outer tubular members in a pre-compressed state, for connecting the inner and outer tubular members with each other. One of the inner and outer tubular members is connected to the suspension, with the other being connected to the vehicle body. A relative vibratory movement between the inner and outer tubular members, which occurs due to vibration of the vehicle body, is absorbed by a resilient deformation of the rubber member.

It is known to subject the rubber member to pre-compression before its installation, so that compression stress remains therein. By such pre-compression of the rubber member, it is possible to mitigate tensile stresses during the course of its resilient deformation, thereby significantly improving the durability of the rubber member (refer, for example, to Patent Document 1).

Patent Document 1 discloses that an outer tubular member is press-fitted into a collar member having an inner diameter that is slightly smaller than the outer diameter of the outer tubular member.

[Patent Document 1] JP 2004-308865 A

DISCLOSURE OF THE INVENTION

Task to be Solved by the Invention

In the prior art, it has been considered that the pre-compression can be achieved by a simple step of reducing the diameter of the outer tubular member or increasing the diameter of the inner tubular member. Practically, however, such a solution may give rise to other problems as explained below, with reference to an outer tubular member disclosed in Patent Document 1, for example, which is deformed to have a reduced diameter. In this instance, if the amount of diameter reduction is increased, while the rubber member is applied with a high residual compression stress, the outer tubular member may undergo plastic deformation so that a resilient force cannot be maintained, with a result that a retaining force for the collar member decreases and the outer tubular member tends to be disengaged from the collar member. Thus, one may be motivated to avoid such a situation by suppressing the amount of diameter reduction, though it then becomes difficult to obtain a sufficient residual compression stress.

The present invention has been achieved in view of these problems, and aims to provide a strut mount wherein a sufficient pre-compression is applied to a rubber member without impairing the retaining force for the rubber member, thereby realizing an improved durability of the rubber member.

Means for Solving the Task

Aspect <1> of the present invention resides in a strut mount comprising an inner tubular member, an outer tubular member arranged on the outer side of the inner tubular member in parallel therewith, and a rubber member arranged between the inner and outer tubular members in a pre-compressed state, for connecting the inner and outer tubular members with each other, wherein the inner tubular member has an inner peripheral surface in which a pre-compression member is press-fitted, and the pre-compression member has an outer diameter that is smaller in a distal end side thereof than in a proximal end side thereof.

Aspect <2> of the present invention resides in a strut mount according to aspect <1>, wherein the pre-compression member has an outer peripheral surface formed with a stepped portion that extends in a circumferential direction, the rubber member has one end side corresponding to the proximal end side of the pre-compression member and provided with a recessed space, and the stepped portion is arranged on the other end side with reference to a bottom surface of the recessed space.

Aspect <3> of the present invention resides in a strut mount according to aspect <1> or <2>, wherein a stopper member is secured integrally to the pre-compression member to project radially outwards from the pre-compression member so as to be engaged by one end of the rubber member.

Aspect <4> of the present invention resides in a strut mount according to any one of aspects <1> to <3>, wherein an annular mounting flange is secured to the outer peripheral side of the outer tubular member, and wherein the outer tubular member has an inner diameter which is relatively large on a side of the mounting flange corresponding to the one end side of the rubber member, and relatively small on a side of the mounting flange corresponding to the other end side of the rubber member.

Effects of the Invention

According to aspect <1> of the present invention, since he inner tubular member has an inner peripheral surface in which a pre-compression member is press-fitted, and the pre-compression member has an outer diameter that is smaller in a distal end side thereof than in a proximal end side thereof, it is possible to deform that portion of the inner tubular member, which corresponds to the distal end side of the pre-compression member, within an elastic deformation range without causing a plastic deformation, to provide a sufficient retaining force for the pre-compression member and also apply a sufficient pre-compression to that portion of the rubber member, which corresponds to the proximal end side of the pre-compression member, as more fully described hereinafter.

According to aspect <2> of the present invention, since a recessed space is provided in one end side of the rubber member, which corresponds to the proximal end side of the pre-compression member, this region of the rubber member can be readily deformed to provide desired vibration-damping characteristic and durability. Moreover, since the stepped portion is arranged on the other end side with reference to a bottom surface of the recessed space, a sufficient rubber volume for pre-compression is available on the proximal end side with reference to the stepped portion, to simultaneously achieve a retaining force for the pre-compression member and apply pre-compression to the rubber member, in a well-balanced manner.

According to aspect <3> of the present invention, since a stopper member is secured integrally to the pre-compression member to project radially outwards from the pre-compression member so as to be engaged by one end of the rubber member, it is possible to ensure that, upon displacement of the inner tubular member toward the one end side of the rubber member, the displacement of the rubber member in the same direction can be limited, thereby restricting the tensile stress that is applied to the rubber member.

According to aspect <4> of the present invention, since an annular mounting flange is secured to the outer peripheral side of the outer tubular member, and wherein the outer tubular member has an inner diameter which is relatively large on a side of the mounting flange corresponding to the one end side of the rubber member, and relatively small on a side of the mounting flange corresponding to the other end side of the rubber member, it is possible to further improve the durability of the rubber member, as more fully described hereinafter.

BRIEF DESCRIPTION OF THE DRAWINGS

The present invention will be described below with reference to preferred embodiments shown in the drawings, wherein.

REFERENCE NUMERALS

Figure 1:
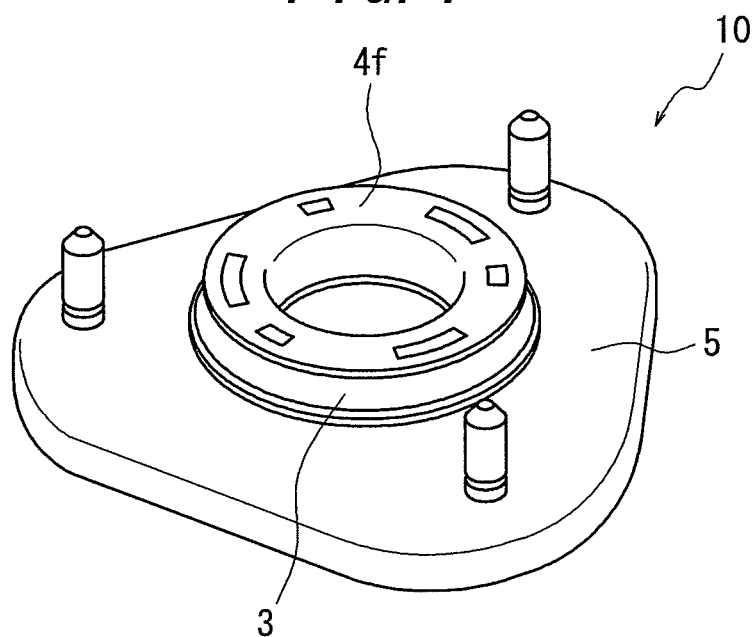
FIG. 1 is a perspective view of the strut mount according to a first embodiment of the present invention.

1 Inner tubular member
1a Lower portion of the inner tubular member
1b Upper portion of the inner tubular member
2 Outer tubular member
2a Lower portion of the outer tubular member
2b Upper portion of the outer tubular member
3 Rubber member
3a Lower portion of the rubber member
3b Upper portion of the rubber member
4 Pre-compression member
4f Stopper member
5 Mounting flange
6 Recessed space
6a Bottom surface of the recessed space
7 Stopper ring
10 Strut mount
11 Stepped portion
20 Strut mount
21 Inner tubular member
21a Lower portion of the inner tubular member
21b Upper portion of the inner tubular member
22 Outer tubular member
23 Rubber member
23a Lower portion of the rubber member
23b Upper portion of the rubber member

BEST MODE FOR CARRYING OUT THE INVENTION

Figure 2:
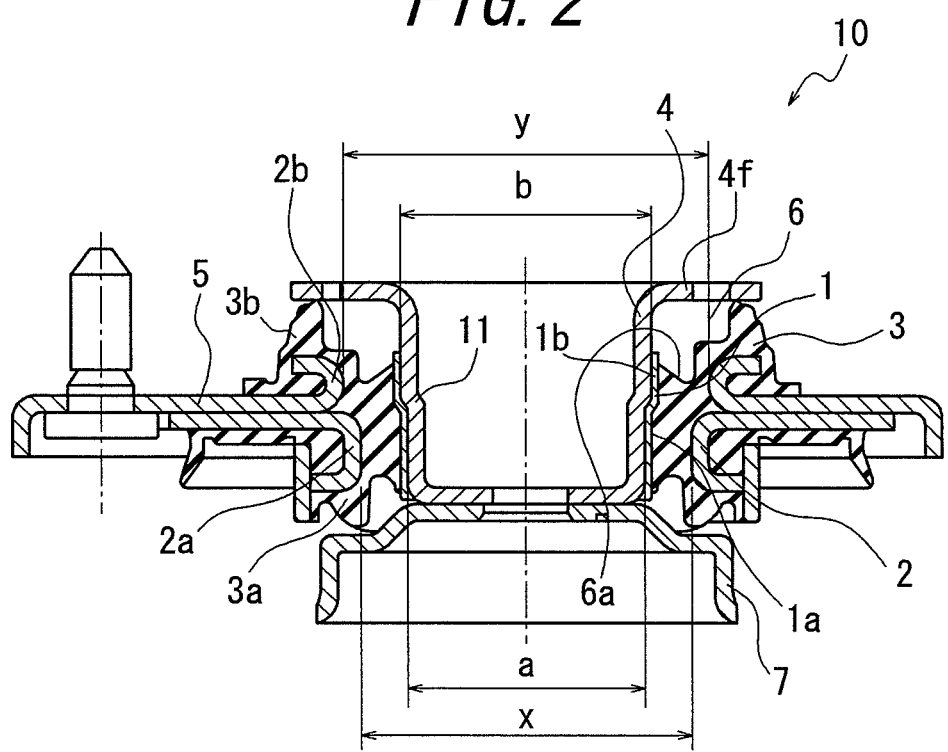
FIG. 2 is a sectional view of the strut mount according to the first embodiment.

FIG. 1 is a perspective view of the strut mount according to a first embodiment of the present invention, and FIG. 2 is a sectional view thereof. The strut mount is designated, as a whole, by reference numeral 10, and includes an inner tubular member 1, an outer tubular member 2 arranged on the outer side of the inner tubular member 1 in parallel therewith, and a rubber member 3 arranged between the inner and outer tubular members 1, 2 in a pre-compressed state, for connecting the inner and outer tubular members 1, 2 with each other.

The strut mount 10 is featured by an arrangement wherein a pre-compression member 4 is press-fitted into the inner peripheral surface of the inner tubular member 1, wherein the pre-compression member 4 has an outer diameter a in its distal end side, which is smaller than the outer diameter b in its proximal end side. In the illustrated embodiment, the pre-compression member 4 has an outer peripheral surface that is provided with a stepped portion 11 which extends in the circumferential direction, and has its diameter that does not change in regions except the stepped portion 11. In the following description, according to the orientation as shown in FIG. 2, the proximal end side and the distal end side of the pre-compression member 4 may be referred to as the upper side and the lower side, respectively, for the sake of convenience.

Figure 3:
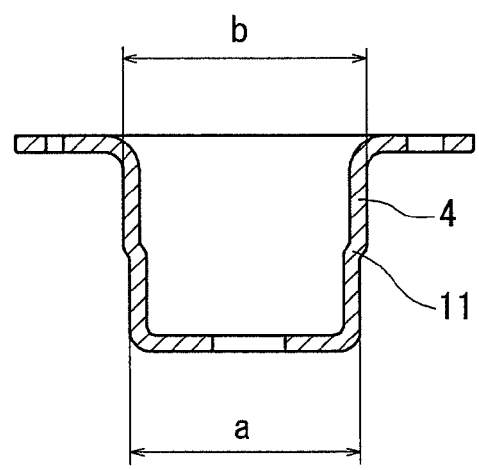
FIGS. 3(a) and 3(b) are sectional views of the strut mount immediately before installation of the pre-compression member.
Figure 3:
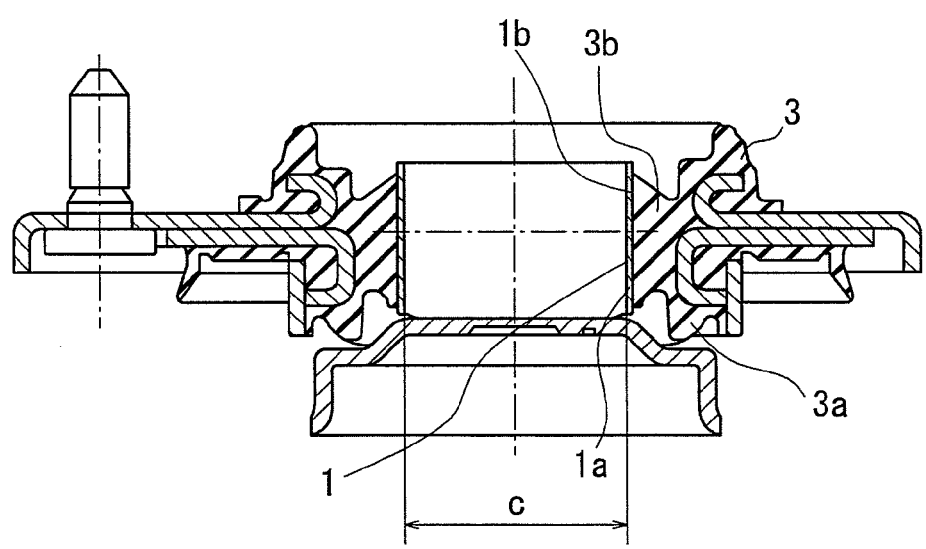

FIGS. 3(a) and 3(b) are sectional views of the strut mount immediately before installation of the pre-compression member 4, wherein FIG. 3(a) shows the pre-compression member 4 and FIG. 3(b) shows the remaining elements. It is noted that the pre-compression member 4 is a rigid and thick member, so that there is no change in its shape before and after the press-fitting into the inner tubular member 1, with its body portion exhibiting a cylindrical shape having the outer diameter a in its distal end side and the outer diameter b in its proximal end side.

The inner tubular member 1 has an inner diameter c which is slightly smaller than the outer diameter a of the body portion of the pre-compression member 4 in its distal end side, before the press-fitting of the pre-compression member 4. Specifically, the inner diameter of the inner tubular member 1 is determined so that, when the per-compression member 4 is press-fitted into inside of the inner tubular member 1, the elongation (a-c)/c in that portion 1a of the inner tubular member 1, which corresponds to the distal end side of the body portion of the pre-compression member 4, takes place within the elastic limit. In contrast, the elongation (b-c)/c in that portion 1b of the inner tubular member 1, which corresponds to the proximal end side of the body portion of the pre-compression member 4, may take place in the plastic deformation range exceeding the elastic limit. It is necessary to achieve a large elongation in the upper portion 1b of the inner tubular member 1, in order to ensure that the portion 3b of the rubber member 3, which corresponds to the proximal end side of the body portion of the pre-compression member 4, is applied with a sufficient pre-compression.

In this way, in the strut mount 10 according to the present invention, the lower portion 1a of the inner tubular member 1 can be deformed within the elastic limit so as to generate a retaining force for the ore-compression member 4 and thereby enhance the connection between these members 1, 4, while the upper portion 1b of the inner tubular member 1 can be subjected to a large elongation to increase its outer diameter and thereby apply a sufficient pre-compression to the upper portion 3b of the rubber member 3 in its outer side.

Here, the application of the pre-compression may be limited to the upper portion 3b of the rubber member 3, for the following reason. That is to say, in a normal use range, the upward displacement of the inner tubular member 1 is larger than the downward displacement thereof, and the rubber member 3 is thus applied with an upward force that is larger than the downward force. As a result, it is necessary to give priority to reduce the tensile stress that acts on the upper portion 3b of the rubber member 3.

In order to mitigate such a tensile stress, it is preferred that a stopper is provided for suppressing the vertical displacement of the rubber member 3. To this end, it is preferred that the pre-compression member 4 is integrally provided, at its proximal end, with a stopper member 4f to project radially outwards from the pre-compression member 4 so as to be engaged by the end of the upper portion 3b of the rubber member 3, while a stopper ring 7 is secured to the distal end of the pre-compression member 4 so as to be engaged by the end of the lower portion 3a of the rubber member 3.

It is preferred that a recessed space 6 is provided in one end side of the rubber member 3, which corresponds to the proximal end side of the pre-compression member 4, i.e. in the upper portion of the rubber member 3, so as to adjust the elasticity of the rubber member and improve its durability. In this instance, it is preferred that the stepper portion 11 provided on the pre-compression member 4 is arranged on the lower side with reference to the bottom surface of the recessed space 6. This is because if, on the contrary, the stepper portion 11 were arranged on the upper side with reference to the bottom surface of the recessed space 6, a sufficient rubber volume for applying the pre-compression to the rubber member 3 would not be available thereby failing to achieve the desired pre-compression effect.

Furthermore, in order to install the strut mount 10, an annular mounting flange 5 may be provided on the outer peripheral side of the outer tubular member 2. In this instance, it is preferred that the inner diameter y of the outer tubular member 2 in its upper portion 2b above the mounting flange 5 is larger than the inner diameter x in its lower portion 2a below the mounting flange 5, so as to increase the rubber volume of the rubber member 3 in its upper portion 3b, and thereby further improve the durability.

Figure 4:
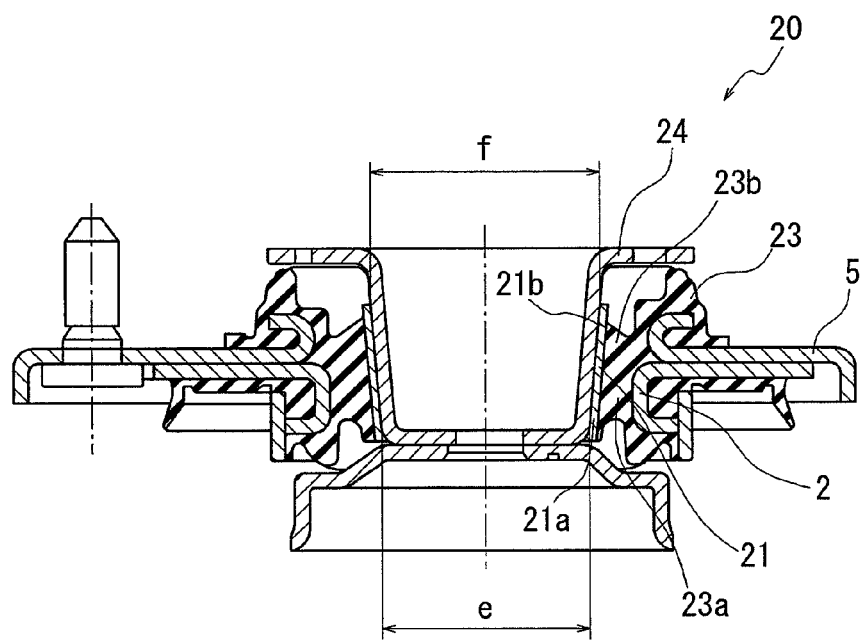
FIG. 4 is a sectional view of the strut mount according to a second embodiment of the present invention.

FIG. 4 is a sectional view of the strut mount according to the second embodiment of the present invention. The strut mount according to the second embodiment is designated, as a whole, by reference numeral 20, and includes a pre-compression member 24 which is essentially same as that in the first embodiment, in that it has an outer diameter e in the distal end side, which is smaller than the outer diameter f in the proximal end side, and the outer diameter is not decreased from the distal end side toward the proximal end side. The difference from the first embodiment resides in that the outer peripheral surface is not provided with a stepped portion and the outer peripheral surface is formed to have a tapered-shape with its diameter decreasing from the distal end side toward the proximal end side. In this instance also, the lower portion 21a of the inner tubular member 21 can be deformed within the elastic limit without causing a plastic deformation, so as to generate a retaining force for the ore-compression member 24 and apply a sufficient pre-compression to the upper portion 23b of the rubber member 23, which corresponds to the proximal end side of the pre-compression member 24.

The invention claimed is:

1. A strut mount comprising an inner tubular member, an outer tubular member arranged on the outer side of the inner tubular member in parallel therewith, an annular mounting flange secured to the outer peripheral side of the outer tubular member and arranged on the outer side of the inner tubular member in parallel therewith, and a rubber member arranged between the inner and outer tubular members and between the inner tubular member and the annular mounting flange in a pre-compressed state, for connecting the inner tubular member with each of the outer tubular member and the annular mounting flange, wherein the inner tubular member comprising an inner peripheral surface in which a cylindrical portion of a pre-compression member is press-fitted so as to form a press-fitted portion where the cylindrical portion is in contact with the inner peripheral surface, and the cylindrical portion of the pre-compression member comprises an outer diameter that is smaller in a distal end side of the press-fitted portion in contact with the inner peripheral surface than in a proximal end side of the press-fitted portion in contact with the inner peripheral surface, wherein the annular mounting flange has a first diameter which is the smallest diameter in an inner peripheral surface of the annular mounting flange, wherein the outer tubular member has a second diameter which is the smallest diameter in an inner peripheral surface of the outer tubular member, the second diameter is smaller than the first diameter, and wherein the annular mounting flange and the outer tubular member are stacked in an axial direction of the strut mount.

2. The strut mount according to claim 1, wherein the pre-compression member has an outer peripheral surface formed with a stepped portion that extends in a circumferential direction in the press-fitted portion, the rubber member has one end side corresponding to the proximal end side of the pre-compression member and provided with a recessed space, and the stepped portion is arranged on the other end side with reference to a bottom surface of the recessed space.

3. The strut mount according to claim 1, wherein a stopper member is secured integrally to the pre-compression member to project radially outwards from the pre-compression member so as to be engaged by one end of the rubber member.

4. The strut mount according to claim 2, wherein a stopper member is secured integrally to the pre-compression member to project radially outwards from the pre-compression member so as to be engaged by one end of the rubber member.

5. The strut mount according to claim 1, wherein the annular mounting flange comprises a first horizontal portion extending in a radial direction of the strut mount and the outer tubular member comprises a second horizontal portion extending in the radial direction, and wherein the first horizontal portion and the second horizontal portion are stacked in the axial direction of the strut mount.

\* \* \* \* \*